J. JOHNSON.
FLUID-METER.

No. 172,124. Patented Jan. 11, 1876.

5 Sheets—Sheet 2.

Attest:

Inventor:

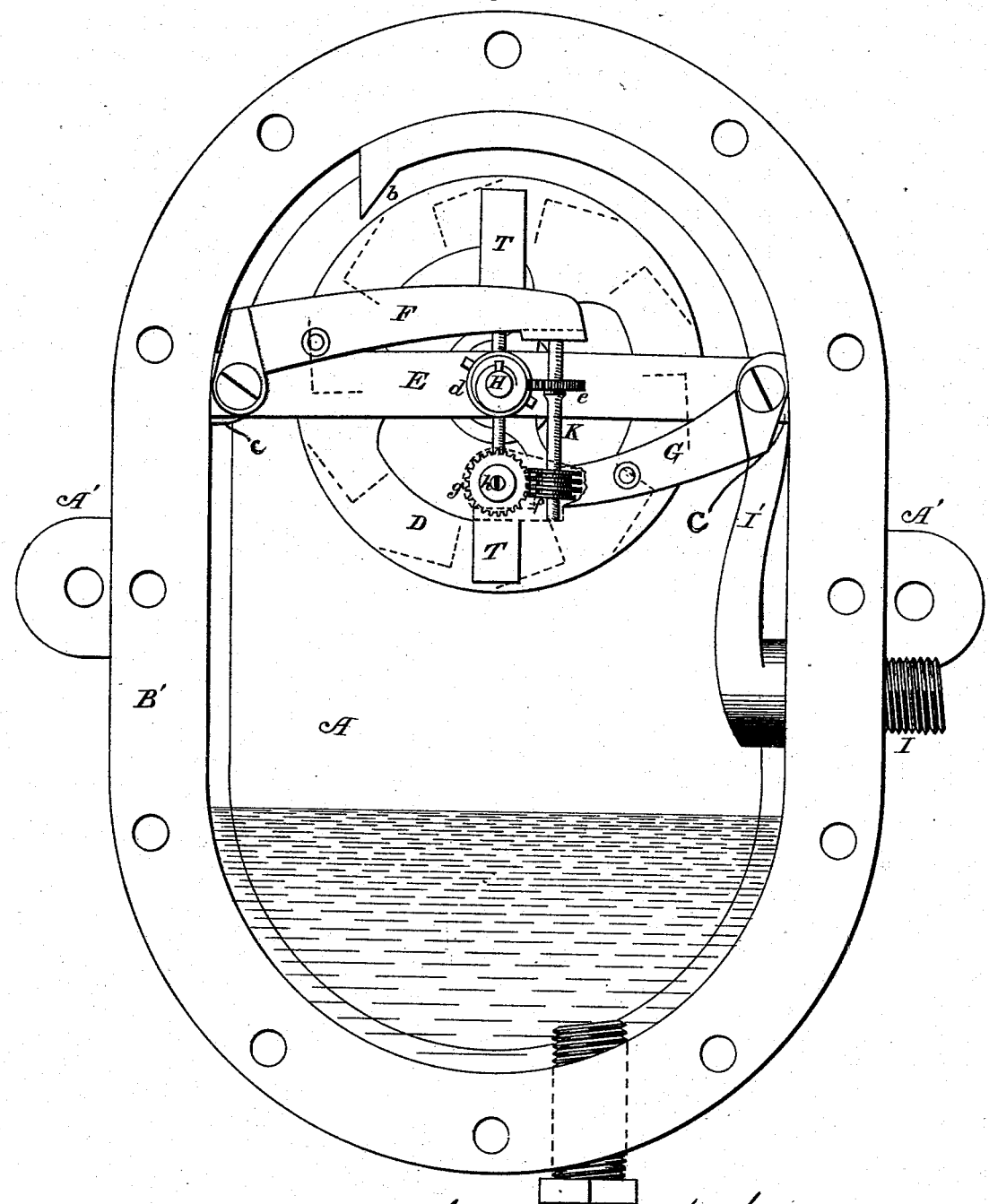

J. JOHNSON.
FLUID-METER.

No. 172,124.

5 Sheets—Sheet 4.

Patented Jan. 11, 1876.

Attest:
Frank W. Seade
S. E. Harding

Jonathan Johnson Inventor:

J. JOHNSON.
FLUID-METER.
No. 172,124.
5 Sheets—Sheet 5.
Patented Jan. 11, 1876.
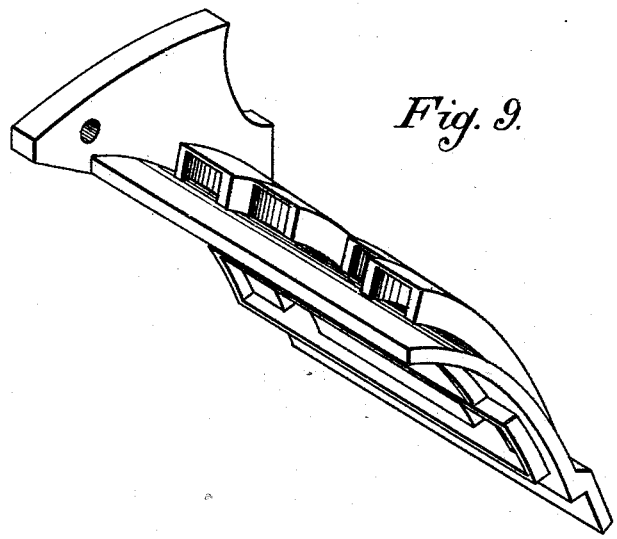
Fig. 9.
Fig. 10.
Fig. 11.
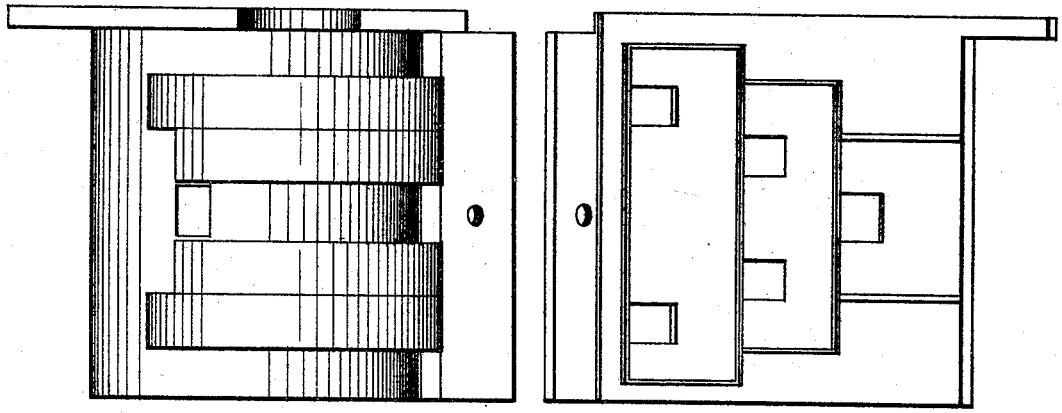

UNITED STATES PATENT OFFICE.

JONATHAN JOHNSON, OF LOWELL, MASSACHUSETTS.

IMPROVEMENT IN FLUID-METERS.

Specification forming part of Letters Patent No. 172,124, dated January 11, 1876; application filed October 30, 1875.

*To all whom it may concern:*

Be it known that I, JONATHAN JOHNSON, of the city of Lowell, county of Middlesex and State of Massachusetts, have invented certain new and useful Improvements in Fluid-Meters, of which the following is such a full, clear, and exact description as will enable others skilled in the art to which it pertains to construct and use the same, reference being had to the accompanying drawings forming a part of this specification, and to the letters of reference marked thereon, similar letters indicating corresponding parts in the different figures.

This fluid-measuring instrument belongs to that subdivision of the class of meters called rotary meters, in which the registering apparatus is put in motion by the action of the fluid upon a revolving wheel. In these, as heretofore constructed, great difficulty has been experienced from the fact that, owing to the friction to be overcome in moving the parts as the moving wheel is wholly immersed in the liquid, small quantities passing the wheel would not impart to it sufficient impetus to start the registering machinery, thus enabling dishonest parties to draw a large amount of water or other fluid through the meter in a small stream without moving the registering apparatus.

My invention is designed to remedy this defect; and in order to accomplish it I keep that part of the case containing the operating and registering mechanism filled with atmospheric air, thus reducing the oxidizing and clogging effect of the surrounding medium to a minimum, and to further resist in producing the desired result the fluid is introduced into the measuring-chambers of a revolving wheel, to which it imparts motion by its weight.

Figure 1:
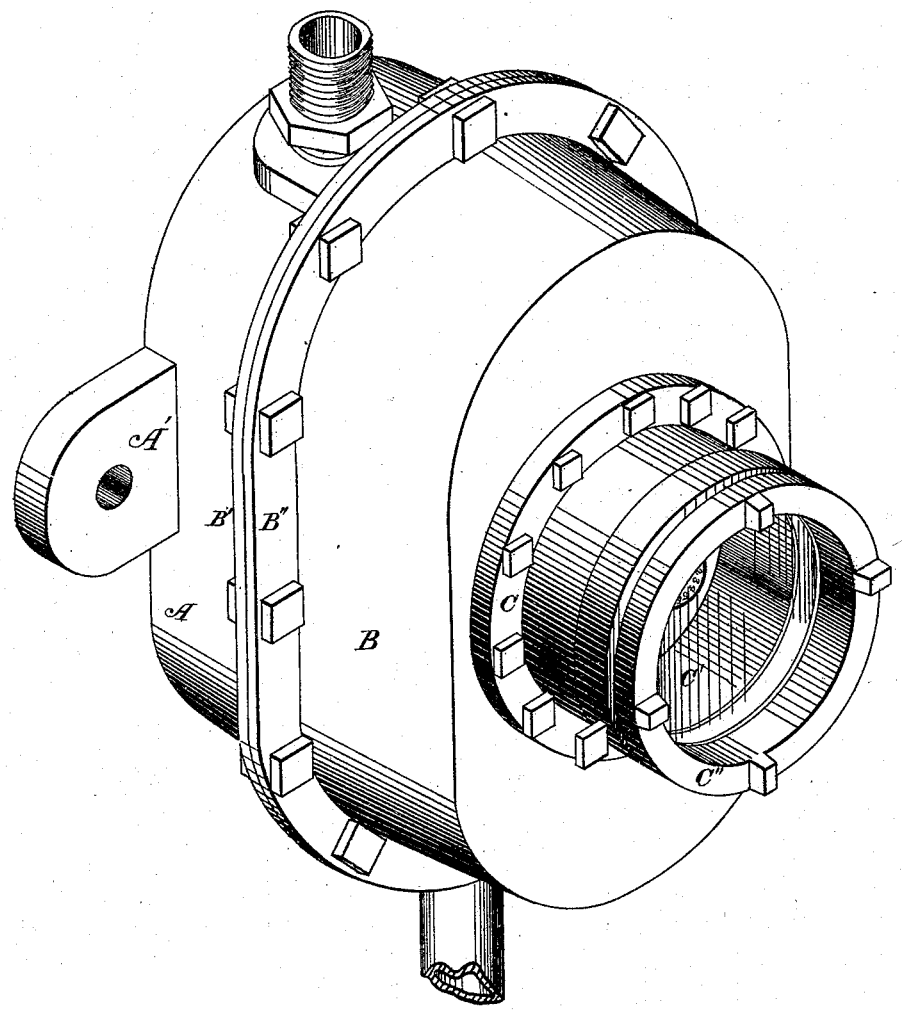
Figure 2:
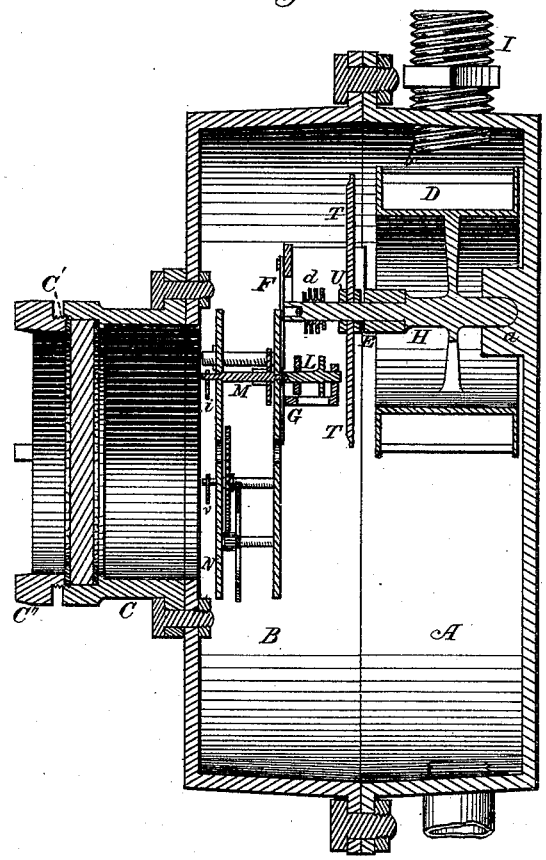
Figure 3:
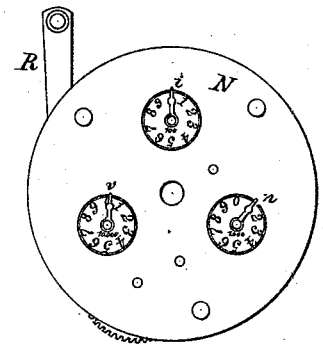
Figure 5:
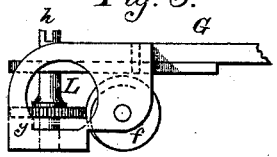
Figure 4:
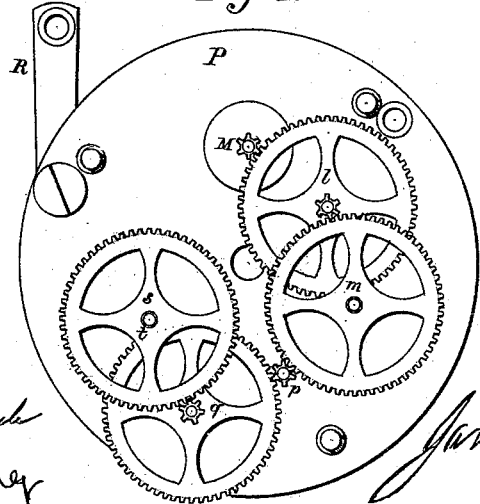
Figure 7:
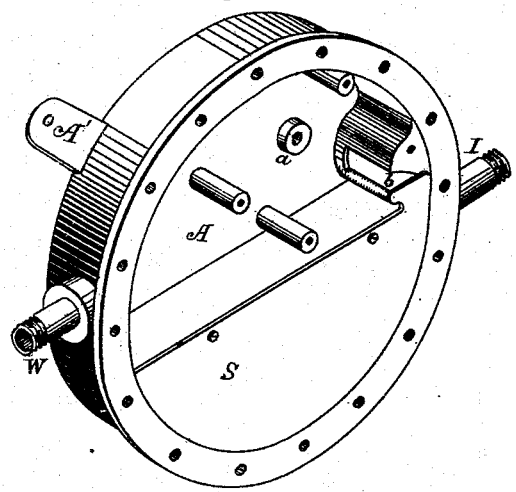
Figure 8:
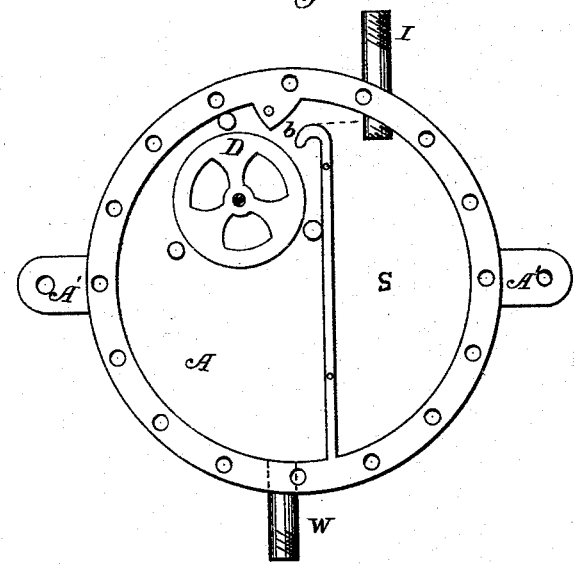

In the accompanying drawings, Figure 1 is a perspective view of the meter in its finished state. Fig. 2 is a longitudinal section through the case, and Fig. 3 shows the registering-dials. Fig. 4 is a plan of the gearing, by which motion is transmitted from the measuring-wheel to the indexes of the registering-dial. Fig. 5 shows detail views of the parts through which the train of gearing is connected with the measuring-wheel. Fig. 6 is a plan of that part of the case containing the measuring-wheel, and illustrates one method of introducing the fluid to it. Figs. 7 and 8 show a modification of the form of case, and illustrate a different method of applying the fluid to the wheel. Figs. 9 and 10 and 11 show a further modification of the devices to be used for introducing the fluid to be measured to the measuring-wheel.

The case containing the operative mechanism is formed in two parts, represented in the drawings by the letters A and B, one of which, the part A, may be provided with the lugs or projections A' for the purpose of securing the apparatus in a vertical position to any suitable support. The part B of the case is secured to the part A by an air-tight joint made by placing any suitable packing material between the flanges B' and B" of the case, and then drawing them closely together by means of screws or bolts. Attached to the outer part of the case B, by the same means that are employed for uniting the two parts A and B, is a cylindrical case, C, provided with a glass cover, C', the whole covering an aperture in the case through which the registering-dials may be seen. This glass is of sufficient thickness to withstand a great pressure, and is secured within the case C by providing the latter with an internally-projecting flange, upon which is placed a gasket of rubber or other suitable packing. The glass is then inserted, after which another packing-ring is placed within the case and upon the glass, the whole being secured by an annular nut, C", which is provided with a screw-thread entering a corresponding thread upon the inner side of the case. It will be observed that this method of packing and securing the glass keeps it at all times between yielding surfaces, thus reducing the chances of breakage to a great extent. A small projection, *a*, within the case forms one of the journal-boxes, within which revolves the shaft of the measuring-wheel D. This wheel is formed with a series of compartments around its periphery, into which the water falls as it enters the case through the inlet-pipe I. This pipe may terminate in different appliances for delivering the fluid upon the wheel, such as the curved pipe I', shown in Fig. 6, or the distributing device shown in Fig. 9 may be used, this latter modification possessing the advantage of being capable of distributing varying quantities of liquid upon different sections of the wheel, and again in using the modified form of case shown in Figs. 7 and 8 the fluid may be delivered upon the wheel from an orifice of proper shape formed at the junction of an inner partition and the outer case, the outlet for the fluid upon the wheel being indicated in the different figures by the letter b, and the ante-chamber by the letter S. As the fluid to be measured varies in viscidity, and the pressure under which it is to be measured also varies, so will the different devices for conducting it to the wheel require change in order to produce the best working effect.

As the measuring-wheel rotates, the contents of its chambers fall to the bottom of the case, and are carried away through the pipe W, thus allowing the upper portion of the case to be always filled with air.

The outer end of the shaft H of the measuring-wheel is journaled in the bridge-tree E, which crosses the case, and is secured to projecting lugs by means of screws or other suitable devices. Upon the extreme outer end of the shaft H is secured a worm-wheel, d, which, by the rotation of the measuring-wheel, imparts motion to the spur-gear e upon the shaft K, the journals of which revolve in bearings upon the shafts F and G. Another worm-wheel, f, is secured to the shaft K, and gives motion to the spur-wheel g upon the shaft L, and this shaft revolves in bearings attached to the supporting-piece G, its outer end, at h, being slotted to receive the driving-pin of the shaft M, which forms the motor-shaft of the train of gearing employed to operate the indexes, the shaft passing through the dial-plate N, and carrying the index i, which indicates units upon the registering-dial, over which it revolves; but it will be understood that each of these units is produced by numerous revolutions of the measuring-wheel, (usually one hundred,) and which is regulated by the number of teeth in the wheels e and g, which receive motion from the worm-wheels d and f. Therefore this dial is called the dial of hundreds.

Upon the shaft M is secured a pinion gearing into the wheel l, the shaft of which carries a pinion which acts upon the teeth of the wheel m secured to the shaft O, which carries the index n on the dial of thousands. An idle-pinion, p, communicates motion from the wheel m to the wheel q, a pinion upon the shaft of which carries the wheel S, and this, in turn, the shaft t, upon which is the index v, revolving over the dial of thousands, each figure upon which indicates that number of thousands of revolutions of the measuring-wheel.

It will be observed that the gearing above described is placed between two circular plates, one of which (the plate N) carries the dials, and is therefore called the dial-plate, the other, P, being secured by screws to the supports G and R, the latter being attached the support F.

It will be obvious that any of the devices in ordinary use for communicating motion from a rotating motor to a registering apparatus may be substituted for that above described, the requisites for its successful action being that it shall be operated with little friction, and that this friction shall be a constant quantity, not liable to change with the different temperatures to which the apparatus may be subjected. The load upon the measuring-wheel is regulated by means of two or more inclined blades, T, which are secured in a hub, U, placed upon the shaft H in such manner that their angles to the plane of rotation may be increased or diminished, as may be desired, thus increasing or diminishing the load upon the measuring-wheel. Other devices may be employed to produce this result, such as a friction-brake applied to some part of its exterior, or a rolling weight within the wheel; but I prefer the device above described, it being regular in its action, easily changed to suit variations in the load to be carried by the wheel, and not liable to derangement from any source, as well as being noiseless in its action.

The operation of the device is follows: After being placed in position, and the particular inlet device adjusted to the wheel, which is believed to be best adapted to the purpose of delivering upon it the fluid to be measured, and the connections with the supplying source made, the regulating-blades are adjusted in such a position as will enable the wheel to carry the desired load. That is, supposing the fluid to be measured is water, the blades may be so adjusted that the water discharged upon the wheel needed to give the number of revolutions required to move the index of the first dial in the series through the space of one division shall be exactly ten gallons; therefore, if the operation be continued, the apparatus will continue to register until ten thousand gallons have passed through it, or the operation may cease and be again resumed as often as may be required, the operation of the instrument ceasing instantaneously with the supply of water, and this function may be controlled upon either the outlet or inlet pipes of the meter with the same result. The case being filled with air, the closing of the outlet would cause its condensation within the upper part of the case until its elastic force would enable it to prevent the entrance of more water by the inlet-pipe; but as the wheel and registering apparatus are always in the same medium—that is, air—a change in pressure would produce no effect upon them; and further, as all the moving parts are continually surrounded by air, and air alone, their friction is rendered a constant quantity, not changing or being in the slightest degree affected by sediment or any other matter which may be held in suspension by the fluid. In using the modification shown in Figs. 7 and 8, at the point where the fluid falls upon the measuring-wheel, through an opening at $b$, and in the modification shown in Figs. 9, 10, and 11, the fluid is discharged upon the wheel through ports of varying elevation, so that increasing or decreasing quantities will be distributed upon different sections of the wheel D. The ante-chamber S exhausts the pressure-force of the fluid and admits it into the air-chamber, principally by its gravity. The fluid filling this ante-chamber forces the air from it into the chamber A.

Having thus described my invention, I claim as new, and desire to secure by Letters Patent, the following:

1. The measuring-wheel D and adjustable regulating-blades T, in combination with the registering devices, substantially as and for the purpose specified.

2. The adjustable regulating-blades T, in combination with the measuring-wheel D, substantially as and for the purpose set forth.

3. The measuring-wheel D and its adjustable regulating-blades T, in combination with the curved pipe I', or its equivalent devices, for introducing the fluid into the chambers of the wheel, as herein shown and described.

In testimony that I claim the foregoing I have hereunto affixed my signature in the presence of two witnesses, at Lowell, Massachusetts, this 11th day of October, 1875.

JONATHAN JOHNSON.

Witnesses:
SAMUEL A. McPHETRES,
FRANK W. SEARLE.